(12) United States Patent
Sander et al.

(10) Patent No.: US 9,540,603 B2
(45) Date of Patent: Jan. 10, 2017

(54) APPARATUS AND PROCESS FOR STABILIZING A LIQUID, IN PARTICULAR BEER

(75) Inventors: Ulrich Sander, Worms (DE); Andreas Zeller, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 74 days.

(21) Appl. No.: 14/005,426

(22) PCT Filed: Feb. 11, 2012

(86) PCT No.: PCT/EP2012/000620
§ 371 (c)(1),
(2), (4) Date: Sep. 16, 2013

(87) PCT Pub. No.: WO2012/123059
PCT Pub. Date: Sep. 20, 2012

(65) Prior Publication Data
US 2014/0004237 A1 Jan. 2, 2014

(30) Foreign Application Priority Data
Mar. 16, 2011 (DE) .................. 10 2011 014 184

(51) Int. Cl.
*C12H 1/056* (2006.01)
*A23L 2/62* (2006.01)
*A23L 2/72* (2006.01)

(52) U.S. Cl.
CPC .............. *C12H 1/0424* (2013.01); *A23L 2/62* (2013.01); *A23L 2/72* (2013.01)

(58) Field of Classification Search
CPC ............. C12H 1/0424; A23L 2/72; A23L 2/62
USPC .............................. 426/330.4, 592; 99/277.1
See application file for complete search history.

(56) References Cited

U.S. PATENT DOCUMENTS

| 3,551,203 A | 12/1970 | Corson et al. |
| 2006/0186033 A1 | 8/2006 | Hanes, Jr. et al. |

FOREIGN PATENT DOCUMENTS

| DE | 4237714 | 5/1994 |
| EP | 1 380 332 | 1/2004 |
| EP | 1 949 948 | 7/2008 |
| WO | WO99/16531 | 4/1999 |
| WO | WO 9916531 A1 * | 4/1999 |
| WO | WO2008/068343 | 6/2008 |

* cited by examiner

*Primary Examiner* — Vera Stulii
(74) *Attorney, Agent, or Firm* — Occhiuti & Rohlicek LLP

(57) ABSTRACT

An apparatus for stabilizing liquid includes first and second filters, intermediate storage that stores a regenerable stabilizing agent, an inlet line supplying unstabilized liquid and connected to both filters and to the intermediate storage, and a switchable interconnection configured for, immediately after regeneration and cleaning of the first or second filter, selectively causing the one of the first filter unit and the second filter unit to be upstream of an other of the first filter unit and the second filter unit. The first filter unit and the second filter unit are configured to run in different operational phases that are offset in time from one another.

19 Claims, 6 Drawing Sheets

Fig. 5

| Time | 00:00 | 02:00 | 04:00 | 06:00 | 08:00 | 10:00 | 12:00 |
|---|---|---|---|---|---|---|---|
| F1 | S | R | S | S | R | S | S |
| F2 | S | S | R | S | S | R | S |
| F3 |   | S | S | R | S | S | R |

Fig. 6

| Time | 00:00 | 02:00 | 04:00 | 06:00 | 08:00 | 10:00 | 12:00 |
|---|---|---|---|---|---|---|---|
| F1 | S | S | R | S | R | S | S |
| F2 | S | S | R | S | R | S | R |
| F3 | R | S | S | R | S | R | S |

| Time | 00:00 | 02:00 | 04:00 | 06:00 | 08:00 | 10:00 | 12:00 |
|---|---|---|---|---|---|---|---|
| F1 | S. | SOS | R | S | SOS | R | S | SOS |
| F2 | S | | SOS | R | S | SOS | R | S |
| F3 | | S | | SOS | R | S | SOS | R | S |

Fig. 7

APPARATUS AND PROCESS FOR STABILIZING A LIQUID, IN PARTICULAR BEER

RELATED APPLICATIONS

This application is the national stage entry of PCT/EP2012/000620 filed on Feb. 11, 2012, which claims the benefit of the priority date of German application DE 10 2011 014184.7, filed on Mar. 16, 2011. The content of the foregoing applications is incorporated herein by reference.

FIELD OF INVENTION

The invention relates to an apparatus for stabilising a liquid, in particular beer, and an associated process.

BACKGROUND

For consumers, cloudiness of beer is unacceptable although in most cases this does not affect its shelf life. The cloudiness is triggered by a chemical reaction of substances contained in the beer, in particular polyphenolic compounds and/or particular protein fractions. To remove polyphenolic compounds from beer, various multi-stage processes are known from the prior art. To do so, before the actual removal of the polyphenolic compounds, first yeasts and turbidity-causing matter are removed from the beer by filtration. The process of the removal of polyphenolic compounds and/or certain protein fractions from the beer is also described as stabilization of the beer.

In the context of the actual stabilization process, the beer is first brought into contact with a stabilization agent that represents a preferred reaction partner for the polyphenolic compounds and/or certain protein fractions. In this connection, basically a distinction is drawn between processes with lost stabilization agents and processes with the possibility of regeneration of the stabilization agent. In practice, polyvinylpolypyrrolidone is frequently used as a stabilization agent. Due to the chemical reaction occurring, the polyphenols are bound to the polyvinylpolypyrrolidone and thus removed from the beer, which almost completely prevents cloudiness, but in any event greatly reduces it, even when the beer is stored for a prolonged period.

The degree of removal of polyphenols from the beer or the beer stabilzsation is dependent on a number of factors; of particular importance are the quantity of stabilization agent added, the number of free adsorption points of the stabilization agent and the length of the contact time of the beer with the stabilization agent. It is known here that by appropriate choice and design of the components of a stabilization apparatus for example with regard to tank volume, flow speeds etc., the entire stabilization apparatus can be designed so that sufficient contact times between the stabilization agent, for example polyvinylpolypyrrolidone and the beer components to be removed and thus adequate stabilization levels can be achieved.

It is also to be taken into account that the stabilizing effect of the stabilization agent polyvinylpolypyrrolidone or other suitable stabilization agent falls with increasing contact or reaction time. This is due to the existing adsorption places of the stabilisation agent being increasingly saturated. In this connection, the addition of fresh stabilization agent is also known during the supply of beer to be stabilized and at approximately the same time, so that a sufficient number of unoccupied adsorption places is always present. The stabilization agent polyvinylpolypyrrolidone is preferably regenerated, this being preferably with sodium hydroxide solution for example.

If the beer now has reached the desired stabilization level, the stabilization agent and the beer are separated from each other again, to avoid over-stabilization and the increased costs associated with this over-stabilization. To separate the stabilization agent from the beer, in practice filter units, so-called pre-coat filters, are used. Here, the stabilization agent added to the liquid to be filtered or the previously pre-coated stabilization agent is used, which is pre-coated on the filter surface. When the liquid to be filtered penetrates through the pre-coated stabilization agent layer, the liquid is filtered. For pre-coat filtration, horizontal filters and so-called cartridge filters are used.

Horizontal filtering has a number of filter plates arranged one on top of the other on a carrier in a filter vessel, the top face of the filter plates being coated with the layer of filter aid. When the fluid penetrates the filter layer, typically a layer of kieselguhr, the filtration occurs. The liquid filtered through it reaches the inside of the plates and is drained from inside the plates through a central pipe.

With so-called cartridge filters, there is a dividing wall in a filter vessel which divides the filter vessel into an unfiltrate and a filtrate chamber. Perpendicular to the plane of the dividing wall, filter cartridges that extend into the unfiltrate chamber are arranged. The filter cartridges have a surface with openings. The structure and functioning of pre-coat filter units of this kind can be found for example in EP 1 380 332 A1. However, the cleaning of this kind of filter cartridge is disadvantageous, and in particular where a poor-quality stabilization agent is used, it is extremely difficult, and the entire filter unit can be damaged during cleaning due to the increased mechanical stresses.

In practice, stabilization systems of this kind are frequently part of a larger production installation. The production installations are made for example for the filtering, stabilization, filling and packing of liquid products, for example beer, whereby all installation components are preferably connected in series, i.e. the outage of an installation component due to operating conditions or faults, leads to the outage of the entire production installation. It has been shown that in installations of this kind, with regard to the installation components, the stabilization, and in particular the regeneration of the stabilization agent frequently represents the reason for the unwanted outages or production interruptions of the entire installation. Thus, in addition to a big loss of time, enormous additional operating and maintenance costs arise.

To resolve this problem, arranging two or more stabilization installations parallel to each other has already been suggested so as to allow a continuous stabilization. These solutions are however not satisfactory due to the high installation costs.

Likewise, from EP 1 949 948 A1, a stabilization installation for the continuous treatment of liquids is known in which polyvinylpolypyrrolidone is used as the stabilization agent, the regular regeneration of which is essential. For regeneration, the use of at least three similarly constructed filter units is proposed, whereby each individual one of these filter units serves as filter, regeneration container and also as a collector vessel in the course of a production cycle. This approach requires a lot of installation input, and is relatively complicated in terms of the management of the entire installation.

SUMMARY

The purpose of the invention is therefore to provide an apparatus and a process for the stabilisation of a liquid, in particular beer, that has a more efficient stabilisation process, and in particular allows a high throughput quantity at low investment costs. A particularity of the apparatus according to the invention consists of connecting and switching means being provided by means of which, in each case, one filter unit directly after its regeneration and cleaning phase can be connected upstream of the next filter unit. Particularly advantageously, the filter unit can thus be used immediately after its regeneration and cleaning phase to stabilize the liquid, in particular beer.

Here, particularly advantageously, the filter units are in the form of pre-coat filter units that have as operation phases offset in time from one another, a pre-coating phase, a stabilization phase and a regeneration and cleaning phase. Advantageously, even in the pre-coating phase of a filter unit, a series connection with at least one of the other filter units in the stabilization phase, i.e. the filter unit at any time found in the pre-coating phase is connected upstream of the at least one filter unit in the stabilization phase.

The filter units in the stabilization phase are preferably connected in parallel to each other to guarantee in this way the highest possible throughput quantity.

In the regeneration and cleaning phase, the particular filter unit is isolated from the inlet line, i.e. during this phase, neither liquid nor stabilization agent are additionally supplied to the particular filter unit.

In the stabilization phase, a pre-coating with a sufficient quantity of stabilization phase to stabilize the unstabilized liquid is carried out.

The connecting and switching means are preferably formed by connecting pipes and associated valves, whereby the outlet of the first filter unit is connected by means of a first connecting pipe and a valve to the inlet of the second filter unit, and the outlet of the second filter unit is connected by means of a second connecting pipe and a valve to the inlet of the first filter unit.

A particularity of the process according to the invention is to be found in that each filter unit is once again supplied with additional stabilization agent immediately after the regeneration and cleaning phase. In this way, the pre-coating phase normally required for the operation of the filter unit is shortened. To do this, each filter unit is operated advantageously in at least three operation phases offset in time from one another, namely a pre-coating phase, a stabilization phase and a regeneration and cleaning phase. In the pre-coating phase, the filter unit is pre-coated by the supply of the unstabilized liquid with additional stabilization agent.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

BRIEF DESCRIPTION OF THE FIGURES

The invention is explained in more detail below by means of the figures using a number of examples of embodiments. The following are shown:

FIG. 5 by way of example, a schematic operating diagram relating to an apparatus with three filter units;

FIG. 6 by way of example, an alternative operating diagram and

FIG. 7 by way of example, a further alternative operating diagram.

DETAILED DESCRIPTION

Figure 1:
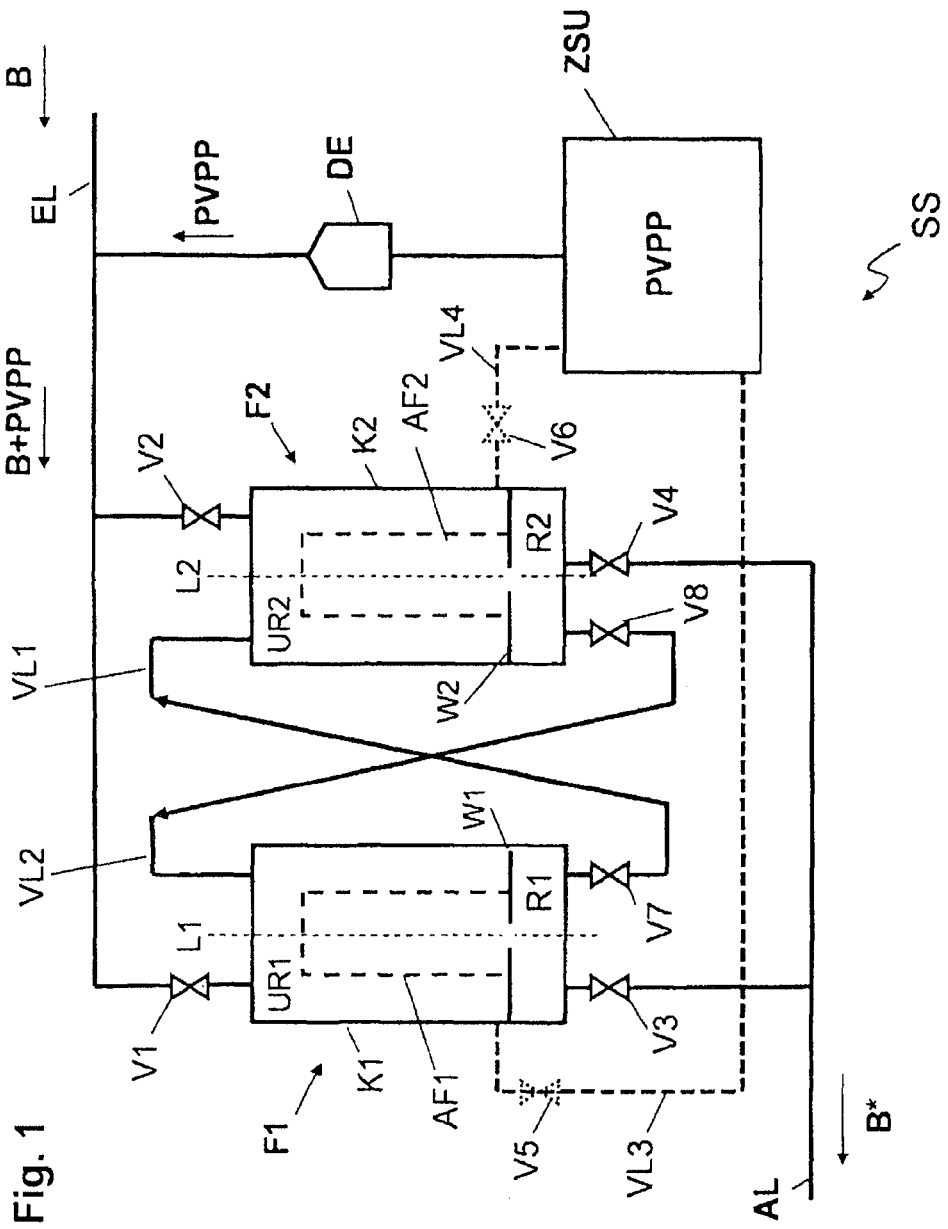
FIG. 1 by way of example, a schematic block diagram of an apparatus for stabilizing a liquid.

FIG. 1 shows, by way of example, an apparatus SS for stabilizing a liquid B, in particular beer, in a schematic block diagram. Stabilization in the meaning according to the invention means the removal of polyphenolic compounds and/or certain protein fractions from the liquid B to be stabilized, in particular beer, wherein a cold or permanent cloudiness in the liquid B, in particular beer, is triggered by the polyphenolic compounds.

The apparatus SS consists at least of a first filter unit F1 and at least a second filter unit F2 and at least an intermediate storage unit ZSU to take a regenerable stabilization agent PVPP, in particular polyvinylpolypyrrolidone. The first and second filter unit F1, F2 are basically structurally identical and preferably made in the form of filter modules.

Figure 4:
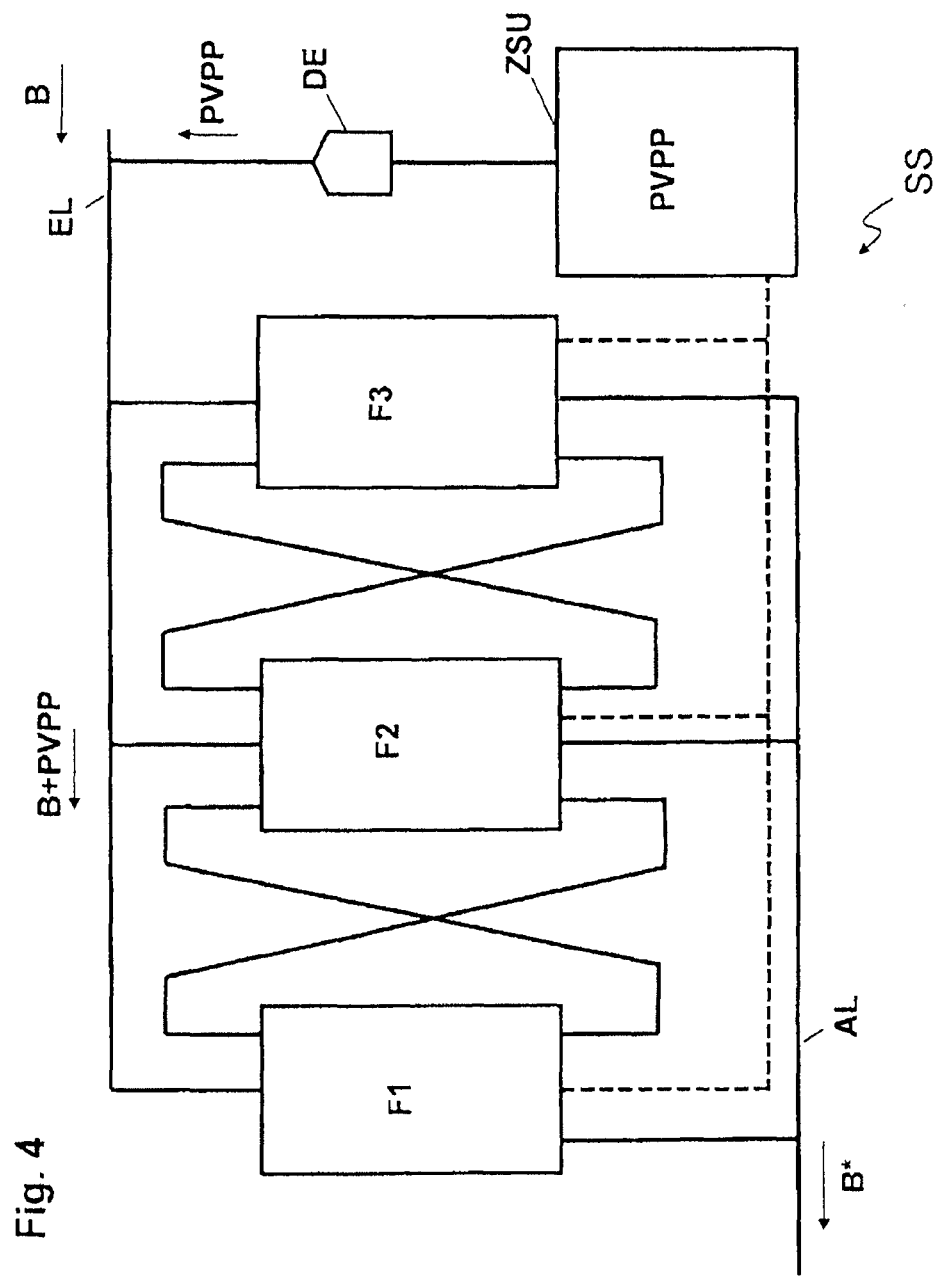
FIG. 4 by way of example, a schematic block diagram of an apparatus for stabilizing a liquid containing three filter units.

Alternatively, in addition to the first and second filter unit F1, F2, further filter units, in particular a third filter unit F3 can be provided. FIG. 4 shows for example in a schematic example of an embodiment, an embodiment variant with three filter units F1, F2, F3. Below, the principle according to the invention is only described by way of example for the embodiment variants with two filter units F1, F2.

The apparatus SS also includes an inlet line EL to supply the liquid B yet to be stabilized, in particular beer, to the first and/or second filter unit F1, F2 and an outlet pipe AL to drain the stabilized liquid B*. The inlet line EL is connected by means of a first valve V1 to the inlet 15 of the first filter unit F1 and by means of a second valve V2 to the inlet of the second filter unit F2. In a similar way to this, the outlet pipe AL is connected by means of a third valve V3 to the outlet of the first filter unit F1 and by means of a fourth valve V4 to the outlet of the second filter unit F2.

Furthermore, the outlet of the intermediate storage unit ZSU is connected by means of a dosing unit DE to the inlet line EL and by means of a fifth valve V5 to the outlet of the first filter unit F1 and by means of a sixth valve V6 to the outlet of the second filter unit F2. By means of the dosing unit DE, the stabilization agent PVPP, in particular polyvinylpolypyrrolidone is added to the unstabilized liquid B transported by means of the inlet line EL in a known way and the unstabilized liquid B with added stabilization agent PVPP is then supplied by means of the inlet line EL to the first and/or second filter unit F1, F2.

According to the invention, connecting and switching means are provided for the series switching of the first and second filter unit F1, F2, and in the present example of an embodiment a first and second connecting pipe VL1, VL2 and a seventh and eighth valve V7, V8 provided for the interconnection of the connecting pipes VL1, VL2. Depending on the operating status of the first and second filter unit F1, F2, either the first filter unit F1 can be connected upstream of the second filter unit F2 or vice versa.

By means of the first connecting pipe VL1, the outlet of the first filter unit F1 can be connected to the inlet of the second filter unit F2 and by means of the second connecting pipe VL2 the outlet of the second filter unit F2 to the inlet of the first filter unit F1. By opening the seventh valve V7, a connection can be made between the outlet of the first filter unit F1 and the inlet of the second filter unit F2, and by opening the eighth valve V8, a connection between the outlet of the second filter unit F2 and the inlet of the first filter unit F1.

With a series connection of the first and second filter unit F1, F2 the first, seventh and fourth valve V1, V7, V4 are opened and the second, third and eighth valve V2, V3, V8 are thus closed. Similarly, with a series connection of the second and first filter unit F2, F1 the second, third and eighth valve V2, V3, V8 are opened and the first, seventh and fourth valve V1, V7, V4 are closed.

All the valves V1 to V8 shown in the figures can preferably be controlled by means of a central control unit (not shown in the figures) so that an automated operation of the system SS is possible.

The first and second filter unit F1, F2 are preferably in the form of so-called pre-coat filter units with which a so-called pre-coating of the filter units F1, F2 with a filter aid is required to provide the complete filter function.

The first and second filter unit F1, F2 have for example a first and second filter vessel K1, K2 that is preferably basically cylindrical in shape. In the first or second filter vessel K1, K2, there is in each case a first or second dividing wall W1, W2, which divides the first or second filter vessel K1, K2 into a first or second filtrate chamber R1, R2 and a first or second unfiltrate chamber UR1, UR2.

The first and second dividing walls W1, W2 are made to take at least one column-type first and second pre-coat filter AF1, AF2, which, starting from the first or second dividing wall W1, W2 extends along the particular longitudinal axis L1, L2 of the first and second filter unit F1, F2 into the unfiltrate chamber UR1, UR2.

To provide the filter function, the pre-coat filters AF1, AF2 of the first and second filter unit F1, F2 are charged with a filter aid until the surface of the first and second pre-coat filter AF1, AF2 is almost completely covered with the filter aid and the filter layer thus arising together with the wall of the column-type pre-coat filter AF1, AF2 produces the filter function.

In the present example of an embodiment, the filter aid used is the regenerable stabilization agent PVPP, in particular polyvinylpyrrolidone, which is provided for stabilizing the unstabilized liquid B. After regeneration of the stabilization agent PVPP contained in the relevant filter unit F1, F2, the regenerated stabilization agent PVPP is removed from filter unit F1, F2 by means of the third or fourth connecting pipe VL3, VL4 and fed to the intermediate storage unit ZSU. The filter unit F1, F2 is cleaned after the removal of the regenerated stabilization agent PVPP and the after undergoing the pre-coating phase is once again available for stabilization and filtering.

After pre-coating the filter unit F1, F2, further stabilization agent PVPP is supplied, by means of the inlet line EL, together with the unstabilized liquid B to the relevant unfiltrate chamber UR1, UR2 of the first or second filter unit F1, F2. Then, by means of the first and second pre-coat filters AF1, AF2 "pre-coated" in this way, a stabilization of the unstabilized liquid B occurs, and the stabilization agent PVPP together with the polyphenolic compounds bound therein and/or other protein fractions are filtered out. Thus only the stabilized liquid B*, which is drained by means of the outlet pipe AL, reaches the filtrate chamber R1, R2 of the first and second filter unit F1, F2.

Pre-coat filters of this kind accordingly have basically three operational phases, namely a pre-coating phase, a stabilization phase S and a regeneration phase R. In the pre-coating phase, a complete stabilization of the liquid B is not yet possible as there is not yet a sufficient quantity of stabilization agent PVPP in the unfiltrate chamber UR1, UR2 and on the surface of the pre-coat filter AF1, AF2. If there is a sufficient concentration of stabilization agent PVPP in the filter unit F1, F2, the filter unit F1, F2 is in the stabilization phase. If almost all resorption points of the filter unit F1, F2 completely filled with stabilization agent PVPP are used, the filter unit F1, F2 needs to be regenerated, i.e. in the regeneration phase, the stabilization agent PVPP is regenerated and removed from the filter unit F1, F2.

Filter units F1, F2 known from the prior art frequently have, per filter unit F1, F2, several column-shaped pre-coat filters AF1, AF2 that are preferably arranged concentrically to the longitudinal axis L1, L2 of the relevant filter unit F1, F2. Disadvantageously, due to this, unavoidable empty or intermediate spaces arise between the individual pre-coat filters within one filter unit F1, F2 that lead to a low volume of trub. The volume of trub in the filter units F1, F2 serves however to take the stabilization agent PVPP and thus directly affects the stabilization process, i.e. the volume of the stabilization agent PVPP that can be absorbed by a filter unit F1, F2 directly affects the service life of a pre-coat filter AF1, AF2 between the essential regeneration phases.

In a preferred embodiment variant, the first and second filter unit F1, F2 have, per filter unit F1, F2, instead of a number of pre-coat filters only one column-shaped pre-coat filter AF1, AF2, which is preferably made in a cylindrical shape and is arranged concentrically to the longitudinal axis L1, L2 of the relevant filter unit F1, F2. In this way, the volume of trub in the first and second filter unit F1, F2 is increased and the service life between two regeneration procedures is thus clearly improved.

The filter units F1, F2 can be used for stabilizing the unstabilized liquid B until the volume of trub in the first or second filter unit F1, F2 is completely filled with stabilization agent PVPP. Then, a regeneration of the stabilization agent PVPP and a cleaning of the filter unit F1, F2 are needed. To do this, the particular filter unit F1, F2 to be cleaned is isolated from the inlet line EL by closing the corresponding valve V1, V2. To regenerate the stabilization agent PVPP in the unfiltrate chamber UR1, UR2, a 1-1.5 percent sodium hydroxide solution at a temperature of around 85° C. is used. If the regeneration of the stabilization agent PVPP in filter unit F1, F2 is finished, it is removed from the filter unit F1, F2 and fed by means of the relevant connecting pipe VL3, VL4 to the intermediate storage unit ZSU and is thus available for use once again.

In this connection, it is of particular importance that the regeneration of the stabilization agent PVPP in a filter unit F1, F2 takes approximately one hour, however the pre-coating of the pre-coat filter AF1, AF2 of the filter units F1, F2 with the stabilization agent PVPP and subsequent stabilization requires several hours. The complete filling of the relevant filter unit F1, F2 with the stabilization agent PVPP can take, for example, over four hours, whereby the time can vary considerably depending on the volume of trub in the filter unit F1, F2 and on the quantity of stabilization agent PVPP to be dosed per hectoliter.

However, basically the time needed to regenerate a filter unit F1, F2 is always less than the time needed to completely fill the volume of trub in one filter unit F1, F2 with the stabilization agent PVPP.

In known processes, the relevant filter unit F1, F2 is therefore only charged with the liquid B to be stabilized, in particular beer, once the filter unit F1, F2 has already been pre-coated.

Figure 2:
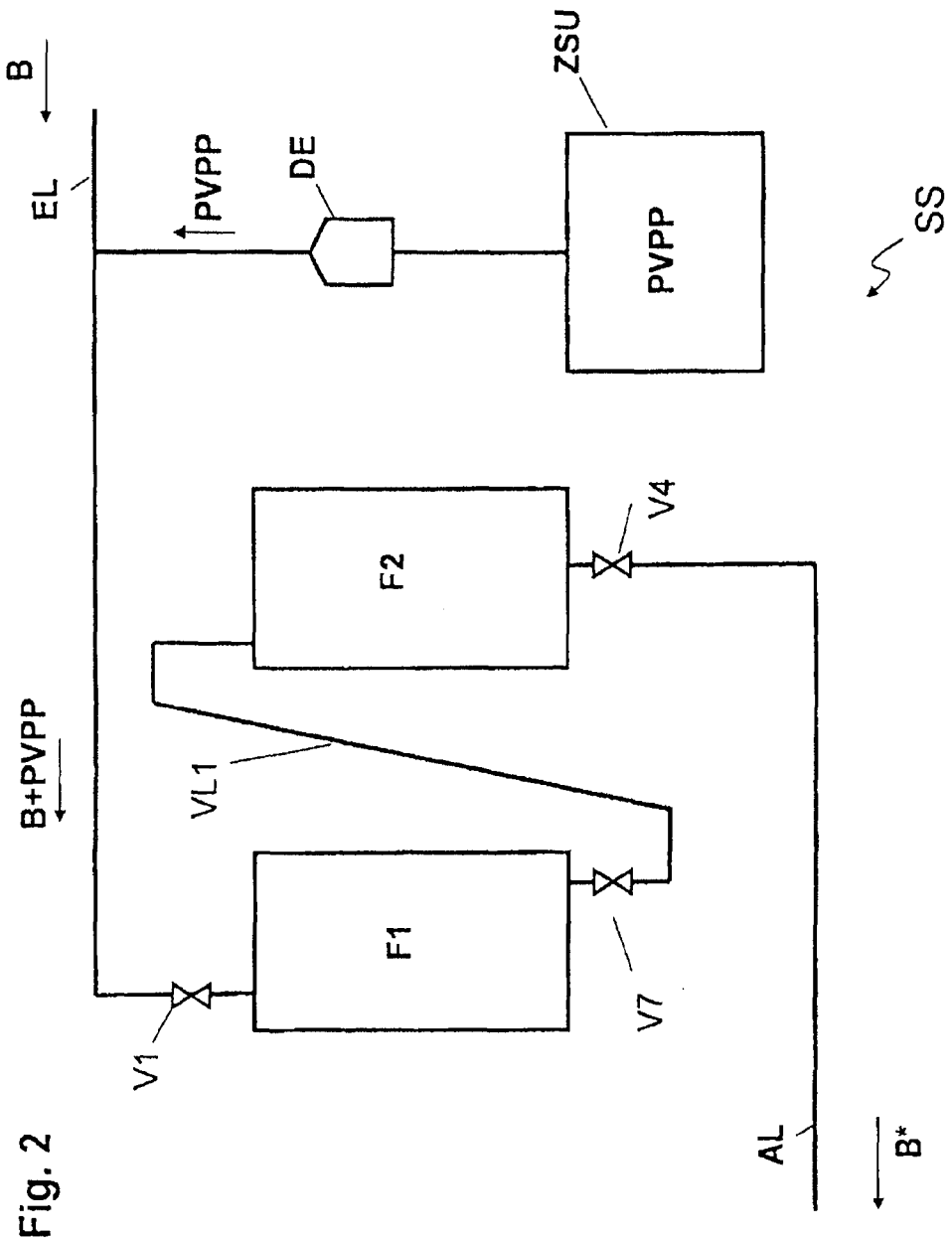
FIG. 2 by way of example, a schematic block diagram of the apparatus with the first filter unit connected upstream.

This is where the present invention starts, and proposes, with the two filter units F1, F2 in operation offset in time from one another, using in each case one filter unit F1 immediately after its regeneration and cleaning, i.e. as early as the pre-coating phase, for stabilization again. To do so, the not yet pre-coated filter unit F1 is operated in series with the second already pre-coated filter unit F2, i.e. the liquid B to be stabilized and the added stabilization agent PVPP are first fed to the first filter unit F1 and there lead to the gradual pre-coating of the first filter unit F1. FIG. 2 shows, by way of example, a block diagram of the system SS according to the invention, namely only the connecting pipes that, in the pre-coating phase of the first filter unit, convey the liquid B to be stabilized. The remaining connecting pipes are not shown in FIG. 2 for reasons of clarity. In the pre-coating phase, in the first filter unit F1, the stabilization agent PVPP is filtered out of the partially stabilized liquid B and the partially stabilized liquid B is fed to the second filter unit F2, which is in the stabilization phase, for complete stabilization. There, the partially stabilized liquid B undergoes a further stabilization and thus produces a completely stabilized liquid B*.

The first filter unit F1 is connected upstream of the second filter unit F2 and both filter units F1, F2 are operated in series until the first filter unit F1 is completely pre-coated and can be operated independently of the second filter unit F2. The series connection is then divided, and the two filter units F1, F2 are operated parallel to each other again. This has the advantage of a clearly higher throughput quantity measured in "hectoliters of stabilized liquid B* per hour." Moreover, also during the pre-coating phase of the first filter unit F1, it is ensured that neither the stabilization agent PVPP nor the not sufficiently stabilized liquid B is used further.

Figure 3:
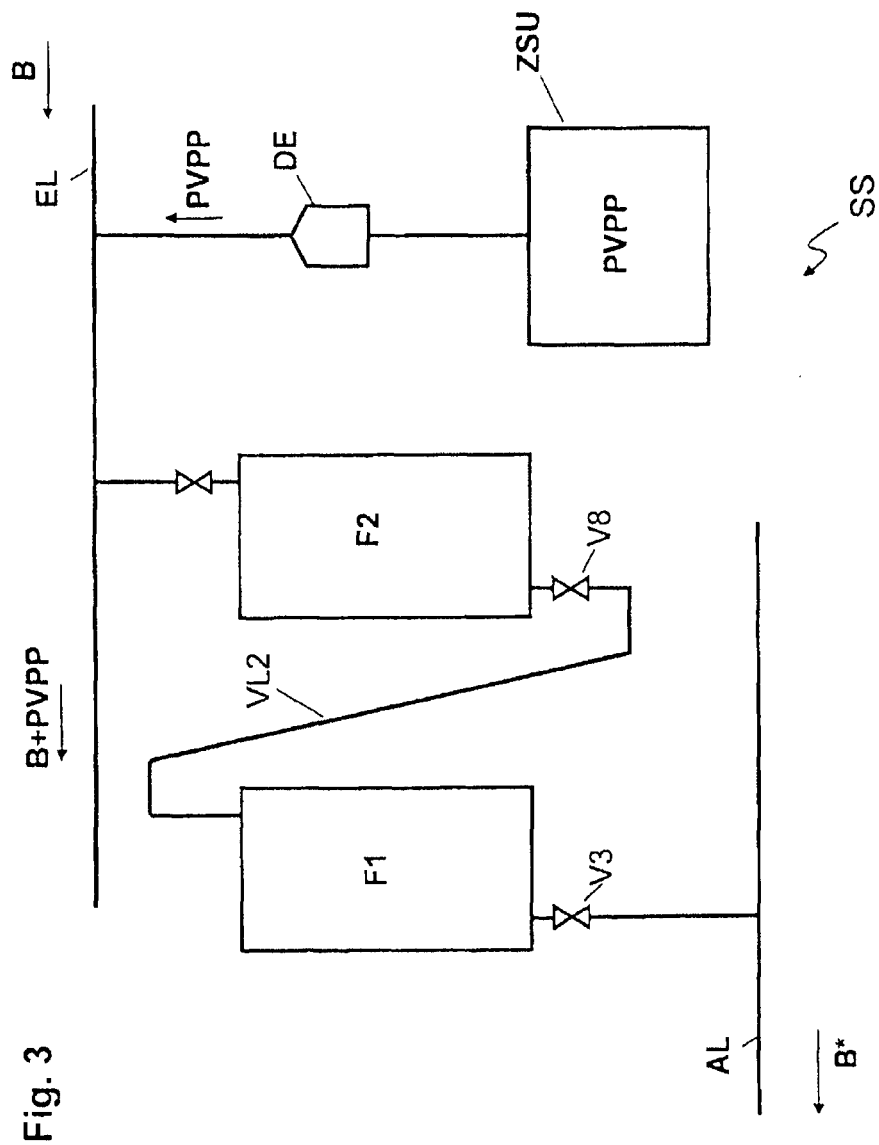
FIG. 3 by way of example, a schematic block diagram of the apparatus with the second filter unit connected upstream.

While the filter units F1, F2 are in the stabilization phase, stabilization agent PVPP with the liquid B to be stabilized is constantly filled into the filter modules F1, F2 operated in parallel to each other. According to the process according to the invention, the second filter unit F2 is filled with stabilization agent PVPP a considerable time before the first filter unit F1 that now is to undergo regeneration and subsequent cleaning. The second filter unit F2 is isolated by closing the second valve V2 from the supply of the liquid B to be stabilized with the added stabilization agent PVPP and is now available for the regeneration of the stabilization agent PVPP contained therein. If the stabilization agent PVPP contained in the second filter unit F2 is regenerated, it is removed from the second filter unit F2 and transferred by means of the fourth connecting pipe VL4 into the intermediate storage unit ZSU. The second not yet pre-coated filter unit F2 is connected upstream of the first pre-coated filter unit F1 and both filter units F1, F2 are operated in series until the second filter unit F2 is completely pre-coated once again. Finally, both filter units F1, F2 are operated in parallel to each other again. FIG. 3 shows by way of example the apparatus SS with the second filter unit F2 connected upstream of it.

In an alternative example of an embodiment, to increase the throughput quantity performance, a third filter unit F3 is provided in addition to the two filter units F1, F2. In this case, the three filter units F1, F2, F3 will operate offset in time from one another. At least two of the three filter units F1, F2, F3 are in fact operated offset in time from one another, whereby, however in each case at least two filter units are in the stabilization phase simultaneously. In this way, the throughput quantity performance can be considerably increased. For example, the throughput quantity performance can even be doubled.

In a similar way to the previously described example of an embodiment with two filter modules F1, F2, the three filter modules F1, F2, F3 in this embodiment variant also undergo continuously and constantly repeated identical procedures. In particular, in each case, the regenerated and cleaned filter unit is connected for pre-coating upstream of at least one of the already pre-coated filter units and after the pre-coating of this filter unit, the stabilization is operated with further pre-coating, and connected in parallel with the already pre-coated filter units. The filter unit that is completely filled with stabilization agent is regenerated and the regenerated stabilization agent removed. Subsequently, a cleaning of this filter unit and a repeated pre-coating occurs in a series connection with at least one filter unit in the stabilization phase S.

In doing so, the individual filter units F1, F2, F3 are operated in such a way that the process phases occurring simultaneously in the filter units F1, F2, F3 have a sufficient offset in time from each other so that at any one time at least two filter units F1, F2, F3 are available to stabilize the liquid B. Here, for example, it is provided that at least two filter units F1, F2 are always in the stabilization phase S, i.e. at least two filter units are available to stabilize the liquid B. In each case, the third filter unit F3 is in the regeneration phase R or is already likewise used for stabilization.

At the same time, on the one hand, it is provided that the third filter unit F3 is in a state of readiness until one of the other two filter units F1, F2 is almost completely filled with stabilization agent PVPP. If this situation is reached, the waiting filter unit F3 is first connected, as described above, upstream of the other two filter units F1, F2 and thus pre-coated. After the pre-coating, the third pre-coated filter unit F3 is likewise used for stabilization, whereby the filter unit completely filled with stabilization agent PVPP moves into the regeneration phase R immediately when the third filter unit comes into operation. By this procedure, the operating diagram illustrated in a simplified form in FIG. 5 arises. This diagram shows the various operating phases of the first to third filter unit F1 to F3 at different times, whereby the various operating phases are entered into by the filter units F1, F2, F3 in each case offset in time from one another. In this way, a two-hour regeneration phase R, for example, is in each case followed by a four-hour stabilization phase S.

Due to the immediate charging, according to the invention, of the relevant filter unit F1, F2, F3 after removal of the regenerated stabilization agent PVPP and cleaning with the liquid to be stabilized with the added stabilization agent PVPP in a series connection with at least one of the filter units in the stabilization phase, the duration of the regeneration phase R is reduced by approximately one half. In this way, a further increase in the throughput performance can be achieved. In FIG. 6, a corresponding operating diagram is illustrated in a simplified representation.

A mode of operation was recognized as particularly advantageous in which the existing series connection between the regeneration not yet pre-coated filter unit and the filter unit already completely filled with stabilization agent PVPP is maintained until almost all resorption points of the stabilization agent PVPP in the filter unit completely filled with stabilization agent PVPP are occupied or used. Due to the series connection still in place, particularly advantageously, no further stabilization agent PVPP can be introduced into the filter unit already completely filled with stabilization agent PVPP. In the case of the operating diagram shown in FIG. 7, this additional operational phase of a filter unit F1, F2, F3 is designated by the acronym SOS, i.e. a "stabilization phase without further stabilization agent furnish".

Particularly advantageous with this procedure is that the resorption points of the stabilization agent PVPP, reactivated by the regeneration of the stabilization agent PVPP, can be completely used to remove the unwanted substances from the liquid to be stabilized, in particular beer, whereby a premature regeneration of the stabilization agent PVPP and the costs associated with a premature regeneration are avoided.

Above, this mode of operation was illustrated by way of example with three filter units, but it is clear that this mode of operation is also applicable where two or more filter units are used.

It is likewise clear that, depending on the mode of operation and/or thickness of the pre-coat layer in one or more filter modules and/or flow interconnection of the filter modules, different or even identical pressure differentials within or also for the individual filter modules need to be set or specified, for which control valves for example can be used. As this situation is self-evident to the person skilled in the art, a detailed description of this situation does not need to be provided here.

The invention was described above using an example of a particular embodiment. It is clear that numerous modifications and variations are possible without thereby departing from the inventive idea underlying the invention.

REFERENCE DRAWING LIST

AF1 First pre-coat filter
AF2 Second pre-coat filter
AL Outlet pipe
B Unstabilized liquid, in particular beer
B* Stabilised liquid
DE Dosing unit
EL Inlet line
F1 First filter unit
F2 Second filter unit
K1 First filter vessel
K2 Second filter vessel
L1 First longitudinal axis
L2 Second longitudinal axis
PVPP Stabilisation agent
R Regeneration and cleaning phase
R1 First filtrate chamber
R2 Second filtrate chamber
S Stabilisation phase
SOS Stabilisation phase without further stabilisation agent furnish
SS Apparatus
UR1 First unfiltrate chamber
UR2 Second unfiltrate chamber
V1 First valve
V2 Second valve
V3 Third valve
V4 Fourth valve
V5 Fifth valve
V6 Sixth valve
V7 Seventh valve
V8 Eighth valve
VL1 First connecting pipe
VL2 Second connecting pipe
VL3 Third connecting pipe
VL4 Fourth connecting pipe
W1 First dividing wall
W2 Second dividing wall
ZSU Intermediate storage unit

The invention claimed is:

1. A method comprising adding polyvinylpolypyrrolidone to beer, supplying said beer, to which said polyvinylpolypyrrolidone has been added, to one of a first filter unit and a second filter unit to remove said polyvinylpolypyrrolidone from said beer, operating said first and second filter units in different operation phases that are offset in time from one another, and supplying said beer, to which said polyvinylpolypyrrolidone has been added, to each filter unit immediately after a regeneration-and-cleaning phase thereof, wherein said different operation phases are selected from the group consisting of a pre-coating phase, a stabilization phase, and a regeneration-and-cleaning phase.

2. The method of claim 1, further comprising causing said first and second filter units to transition into a state in which said first and second filter units are in series.

3. The method of claim 1, further comprising causing said first and second filter units to transition into a state in which said first and second filter units are in parallel.

4. The method of claim 1, further comprising switching a configuration of said filter units using a switchable interconnection.

5. The method of claim 1, wherein operating said first and second filter units in different operation phases that are offset in time from one another comprises causing said first filter unit to be upstream of said second filter unit when said first filter unit is in a pre-coating phase and said second filter unit is in a stabilization phase.

6. The method of claim 1, further comprising supplying beer to said first filter unit via an inlet line that is connected to an intermediate storage unit that stores regenerated polyvinylpolypyrrolidone, and supplying beer to said second filter unit via said inlet line.

7. The method of claim 1, further comprising connecting an intermediate storage unit that stores regenerated polyvinylpolypyrrolidone to an inlet line that brings beer to said first filter unit and to said second filter unit.

8. The method of claim 7, wherein connecting said intermediate storage unit comprises connecting said intermediate storage unit via by a dosing unit that adds polyvinylpolypyrrolidone to said beer.

9. The method of claim 1, further comprising, during said pre-coating phase, pre-coating one of said first and second filter units by supplying beer to which polyvinylpolypyrrolidone has been added.

10. The method of claim 1, further comprising, during an additional operation phase of a first filter unit, placing said first filter unit, which has been completely pre-coated with polyvinylpolypyrrolidone, in series with a second filter unit, which is operating in a pre-coating phase, and running said first filter unit without any further supply of polyvinylpolypyrrolidone.

11. A process comprising connecting an output of a first filter to an input of a second filter, feeding, into an input to said first filter, beer to which polyvinylpolypyrrolidone has been added, concurrently operating said first and second filters in different operation phases, receiving, from an output of said second filter, beer from which polyvinylpolypyrrolidone has been removed, connecting said output of said second filter to said input of said first filter, feeding, into said input of said second filter, beer to which polyvinylpolypyrrolidone has been added, concurrently operating said second and first filters in different operation phases, and receiving, from said output of said first filter, beer from which polyvinylpolypyrrolidone has been removed.

12. The process of claim 11, wherein either step concurrently operating comprises selecting said different operation phases from the group consisting of a stabilization phase, a regeneration phase, and a pre-coating phase.

13. The process of claim 11, wherein concurrently operating said first and second filters in different operation phases comprises operating said first filter in a pre-coating phase and operating said second filter in a stabilization phase, and wherein concurrently operating said second and first filters in different operation phases comprises operating said first filter in a stabilization phase and operating said second filter in a pre-coating phase.

14. The process of claim 11, wherein concurrently operating said first and second filters in different operation phases comprises operating said first filter in a pre-coating phase, and wherein concurrently operating said second and first filters in different operation phases comprises operating said second filter in a pre-coating phase.

15. The process of claim 11, wherein feeding beer to which polyvinylpolypyrrolidone has been added into an input to a first filter, and connecting an output of said first filter to an input of a second filter occur immediately after said first filter has completed a regeneration phase.

16. The process of claim 15, wherein connecting said output of said second filter to said input of said first filter, and feeding beer to which polyvinylpolypyrrolidone has been added into said input of said second filter occur immediately after said second filter has completed a regeneration phase.

17. A process comprising adding polyvinylpolypyrrolidone to beer, connecting a first filter and a second filter in series, wherein connecting said first filter and said second filter in series comprises connecting said first filter upstream of said second filter, feeding said beer, to which polyvinylpolypyrrolidone has been added, into an input of said first filter, operating said first filter in a first operation phase, concurrently with operating said first filter in said first operation phase, operating said second filter in a second operation phase, wherein said second operation phase is an operation phase that is different from said first operation phase, receiving, from an output of said second filter, beer from which said polyvinylpolypyrrolidone has been filtered by said second filter, cleaning and regenerating said second filter, immediately after having cleaned and regenerated said second filter, connecting said first filter and said second filter in series with said first filter now being downstream of said second filter instead of being upstream of said second filter, operating said second and first filters in different operation phases simultaneously, and receiving, from an output of said first filter, beer from which said polyvinylpolypyrrolidone has been filtered by said first filter, wherein said operation phases are selected from the group consisting of a pre-coating phase, a stabilization phase, and a regeneration-and-cleaning phase.

18. The process of claim 17, wherein feeding beer into an input of said first filter comprises feeding beer in which polyvinylpolypyrrolidone is present in a first concentration, wherein receiving beer from said output of said second filter comprises receiving beer in which polyvinylpolypyrrolidone is present in a second concentration that is less than said first concentration, wherein receiving beer from said output of said first filter comprises receiving beer in which polyvinylpolypyrrolidone is present in a third concentration that is less than said first concentration, and wherein said second and third concentrations are equal.

19. The process of claim 18, further comprising, while said first filter is upstream of said second filter, feeding beer in which polyvinylpolypyrrolidone is present in a fourth concentration from said output of said first filter into an input of said second filter, wherein said fourth concentration is between said first concentration and said second concentration, and wherein said fourth concentration decreases with time.

* * * * *